Sept. 28, 1965 K. STEISSLINGER ETAL 3,208,364
COUPLING BETWEEN DELAYED-ACTION MECHANISM
AND CAMERA ACTUATING MECHANISM
Filed June 14, 1962 4 Sheets-Sheet 2

Kurt Steisslinger
Paul Härter
INVENTOR.

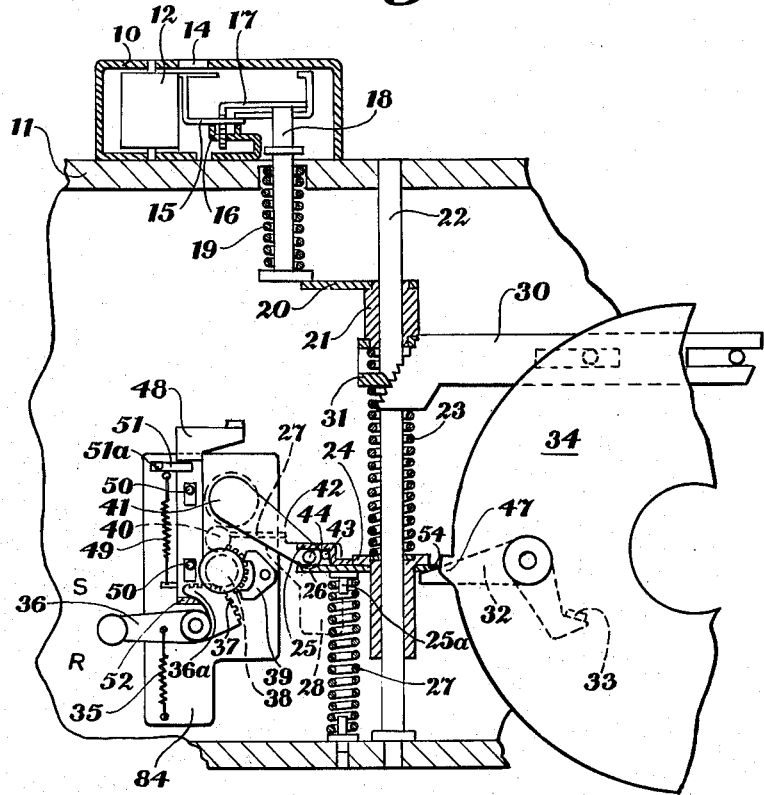
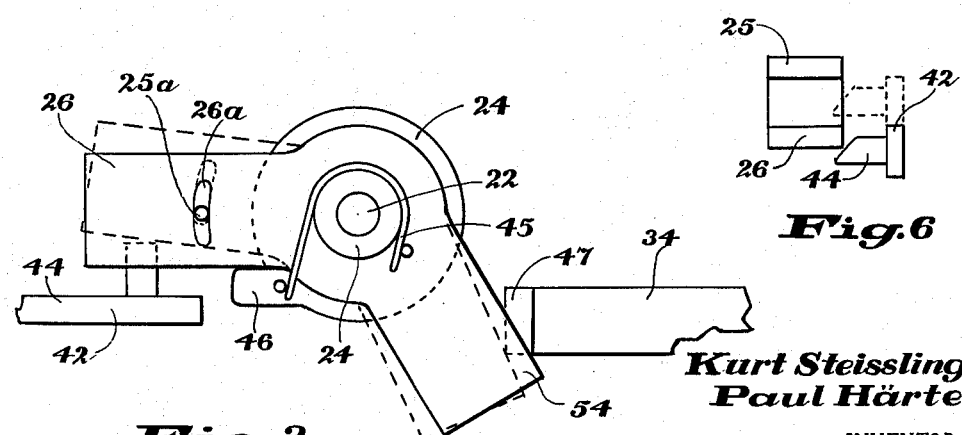

Sept. 28, 1965  K. STEISSLINGER ETAL  3,208,364
COUPLING BETWEEN DELAYED-ACTION MECHANISM
AND CAMERA ACTUATING MECHANISM
Filed June 14, 1962  4 Sheets-Sheet 4
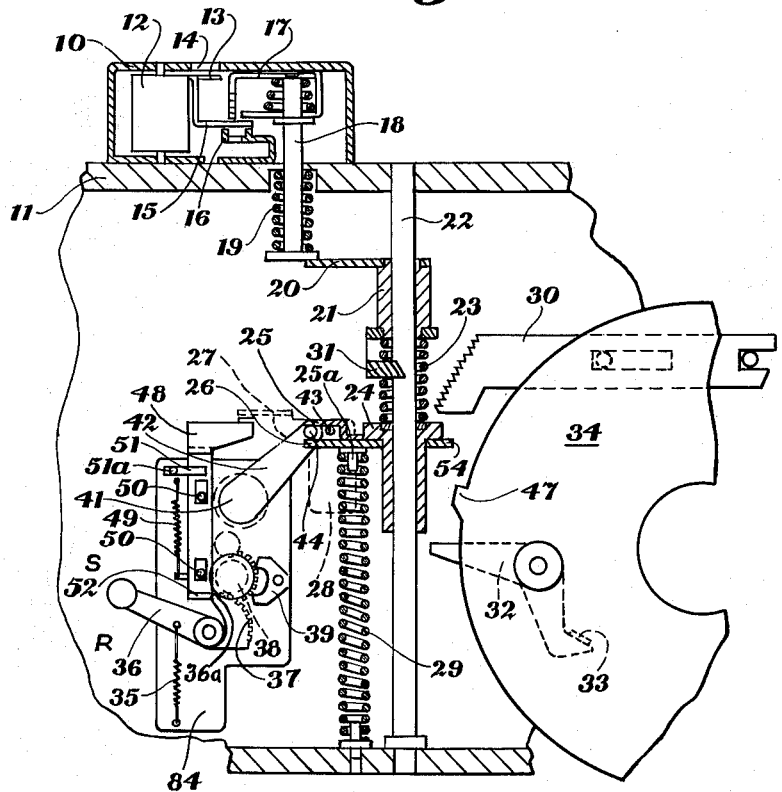
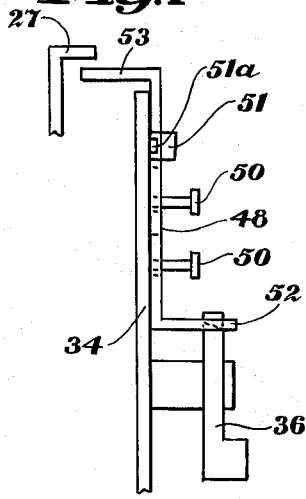
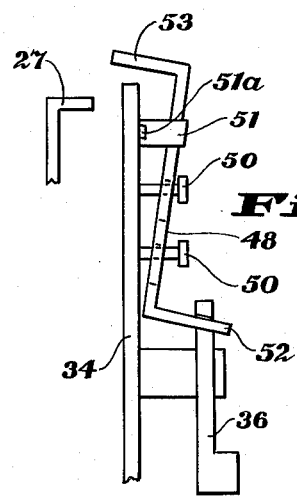
Kurt Steisslinger
Paul Härter
INVENTOR.
BY
ATTORNEYS United States Patent Office 3,208,364
Patented Sept. 28, 1965

3,208,364
COUPLING BETWEEN DELAYED-ACTION MECHANISM AND CAMERA ACTUATING MECHANISM
Kurt Steisslinger, Stuttgart-Hedelfingen, and Paul Härter, Ruit, Kreis, Esslingen, Germany, assignors to Eastman Kodak Company, Rochester, N.Y., a corporation of New Jersey
Filed June 14, 1962, Ser. No. 202,469
Claims priority, application Germany, June 15, 1961, K 44,002
3 Claims. (Cl. 95—53.3)

This invention relates to a coupling between a camera's delay means or delayed-action mechanism and camera actuating mechanism, and more specifically to an intercoupling between a camera's delayed-action mechanism and camera actuating mechanism allowing delayed-action exposures to be regulated by an exposure control system.

Many cameras employ exposure control systems in which a sensing member, arranged to be freed for operation by movement of a camera actuating mechanism, senses the deflected position of a member moving as a function of scene brightness. The sensing member controls the adjustment of one or more exposure settings, e.g., a diaphragm aperture setting and/or a shutter speed setting in accordance with the sensed position of the deflected member.

Within such a system, it is an object of the present invention to intercouple a delayed-action mechanism with a camera actuating mechanism so as to allow delayed-action of automatically or semi-automatically controlled exposures.

Another object of this invention is to intercouple by simple and economic means, a camera actuating mechanism and a built-in delayed-action mechanism of the type which is physically separate from the camera's shutter, and further, to arrange such an intercoupling so as not to disturb the relationship between the camera actuating mechanism and an exposure control system.

These and other objects of the present invention are accomplished by a simple coupling mechanism for intercoupling a camera actuating mechanism and a delay means upon energization of the delay means. The coupling is arranged so that an initial movement of the actuating mechanism through its path initiates a timed operation of the delay means under control of which the actuating mechanism is moved further through its path to a second or actuated position in which it operates a shutter release member. Such movement of the actuating mechanism also initiates adjustment of the exposure control system.

The invention will better be understood by reference to the drawings wherein:

FIG. 1 presents a front view of a camera provided with the invention showing the delay means in its rest condition and the camera actuating mechanism in its initial position.

FIG. 3 shows an enlarged bottom view of a coupling device for connecting an actuating mechanism component with the delay means.

Figure 1:
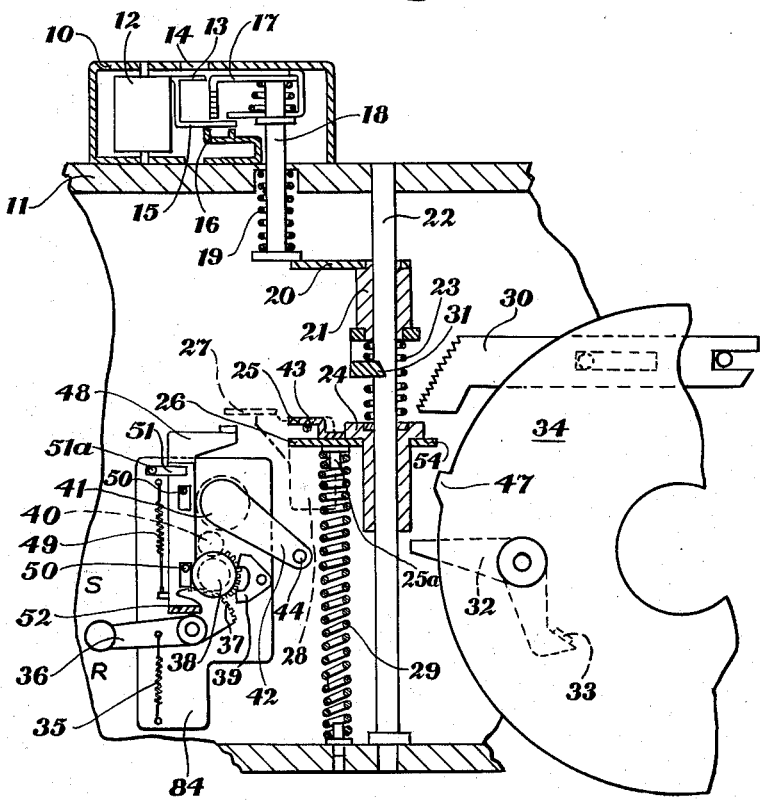

FIG. 4 presents a front view of a camera provided with the invention showing the delay means in its energized condition and the camera actuating mechanism in its initial position.

FIG. 5 shows a camera according to FIG. 4 illustrating the rest condition of the delay means and the second position of the actuating mechanism.

FIG. 6 shows a right side view of a cam for accomplishing a coupling between the delay means and a component of the actuating mechanism.

FIG. 7 shows a right side view of a blocking member or slide for initiating automatic operation of the delay means.

FIG. 8 shows the blocking members according to FIG. 7 in the position assumed when the delay means is in its rest condition.

Referring to the drawings in which corresponding parts have been identified with the same number, an exposure meter housing 10 is fastened to a camera housing 11. A member 12, an electric measuring instrument mounted for rotation, is arranged for moving or deflecting as a function of scene brightness as sensed by a photoelectric cell (not shown) which is electrically in circuit with member 12. The deflecting member 12 may be adjusted for film speed and exposure time by means well known in the exposure meter art.

The deflecting member 12 is provided with a pointer 13 visible in window 14 of exposure meter housing 10, and the pointer 13 cooperates with a scale (not shown) for indicating diaphragm setting value. Moving with member 12 and pointer 13 is pointer 15 which moves over an anvil 16. Stepped sensing member 17 fixed to sliding bolt 18 is arranged for sensing the position of pointer 15 by moving downward to a point where the pointer 15 is trapped and held against the anvil 16, and because of the steps in sensing member 17, the extent of its downward motion is determined by the position of pointer 15.

Spring 19 is arranged for forcing bolt 18 downward to the point where stepped sensing member 17 is stopped by engagement with the pointer 15 according to the pointer's position above anvil 16. The bolt 18 is held in the raised position illustrated in FIG. 1 by arm 20 of slide 21 which slides on guide 22. The slide 21 is urged upward by spring 23 which also bears against slide 24 which comprises part of the camera actuating mechanism. By "camera actuating mechanism" is intended not only a body release or manually operable member outside the camera housing (not shown) adapted for hand or finger operation, but any linking members connecting such a lever with the camera shutter and exposure control system, including in the illustrated embodiment, pin 43 fixed to the manually operable member (not shown) arms 25 and 26, slide 28, arm 27, slide 24, spring 23, slide 21, arm 20 and silding bolt 18. Of course, many well-known levers, couplings and linkages are available for transmitting movement of a manually operable member to a shutter release member and exposure control system, and this invention is not limited to the disclosed coupling members.

Spring 29 urges upward against flanged stud 25a fixed to arm 25 which is fixed to slide 24, so that in the absence of manual force on the actuating mechanism, slide 24 is held up in the position shown in FIG. 1. The force of spring 23 is just adequate to hold arm 20 against bolt 18 for the widest vertical separation between silde 24 and bolt 18.

A stepped diaphragm setting slide 30, mounted for horizontal sliding movement, is arranged for engaging stop 31, fastened to slide 21 for setting the camera diaphragm. Since the vertical position of stop 31 is determined by the position of pointer 15 as sensed by stepped sensing member 17, and since the horizontal movement of diaphragm setting slide 30 is determined by the vertical position of stop 31, the diaphragm may be set as a function of scene brightness. Means for adjusting a diaphragm setting in accordance with the position of a member movable as a function of scene brightness are well known in the exposure control art. By one of such means, diaphragm setting slide 30 is latched in the retracted position illustrated in FIG. 1, and is spring-loaded toward engagement with stop 31. Release of the shutter, or altenatively a predetermined movement of the camera actuating mechanism frees diaphragm setting slide 30 for sliding into engagement with stop 31.

Figure 2:
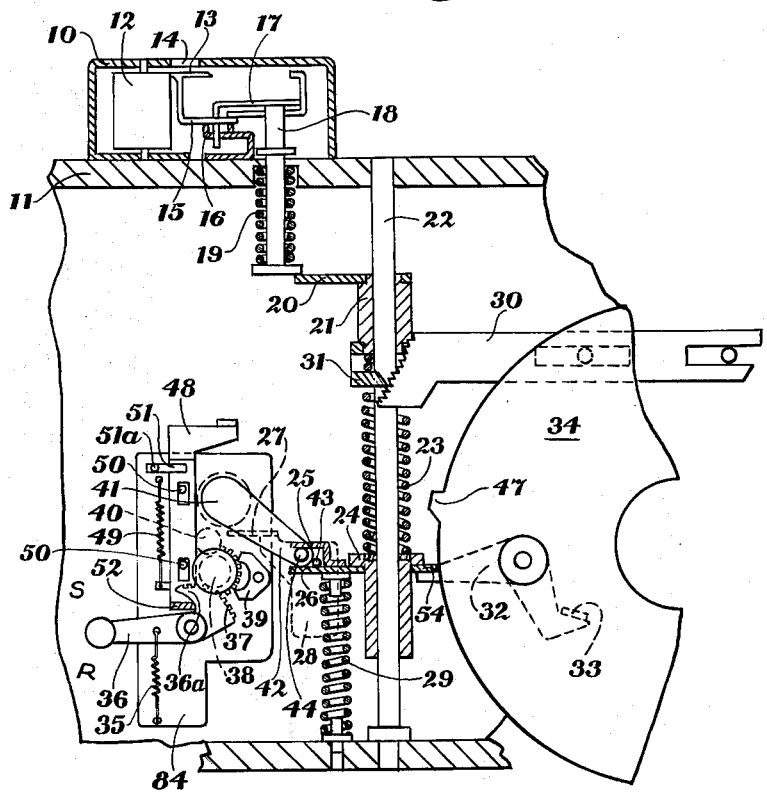
FIG. 2 shows a camera according to FIG. 1 with the actuating mechanism in a second or actuated position in which it operates the shutter release member.

A camera actuating is accomplished by manually moving the camera actuating mechanism downward and this movement causes slide 24 of the camera actuating mechanism to travel downward to the position illustrated in FIG. 2. In this position, slide 24 operates shutter release lever 32 which, by means of ear 33, releases the shutter. Release of the shutter allows a spring-loaded shutter blade drive-ring 34 to rotate a small amount and open and close shutter blades (not shown) in a well-known fashion.

Discontinuing the downward force on the actuating mechanism allows spring 29 to force slide 24 upward to its initial position as illustrated in FIG. 1 with accompanying movements of slide 21 and bolt 18 to the positions illustrated in FIG. 1.

A delay means or delayed-action mechanism for delaying shutter actuation is mounted on plate 84. The driving force for operating the delay means comprises a spring 35 urging selecting lever 36 downward. Operation of the delayed-action mechanism transmits motion to a driving arm 42 through gear sector 37 of selecting lever 36, gear 38, controlled by escapement mechanism 39, and gears 40 and 41. As illustrated in FIG. 1, the delay means is not energized and does not affect camera actuation.

A manually operable lever outside the camera housing (not shown) is coupled to slide 24 by means of a pin 43 fixed to slide 28 and the manually operable lever and extending between arm 25, which is fixed to slide 24, and arm 26, which is mounted for rotation about slide 24. Coupling of the delay means to the camera actuating mechanism's slide 24 is accomplished by positioning pin 44 of driving arm 42 between the arms 25 and 26.

As shown in FIG. 6, pin 44 of driving arm 42 has a cam surface arranged so that upward movement of driving arm 42 with respect to arm 26, or downward movement of arm 26 with respect to driving arm 42 moves aside arm 26 so as to allow pin 44 to lodge between arms 25 and 26. Such moving aside of arm 26 in response to the cam surface of pin 44 is possible because arm 26 is mounted for rotation about the axis of slide 24 as illustrated in the bottom view of FIG. 3. A spring 45 is arranged for urging arm 26 toward the rear of the camera housing and against stop 46 which projects downward from slide 24. Arm 25 is fixed to slide 24, and a flanged stud 25a is fastened to arm 25 with its flange disposed below arm 26 for bearing the thrust of spring 29. Arm 26 is provided with a curved slot for engaging stud 25a, so that arm 26 is able to rotate free of the upward thrust of spring 29. In response to the camming action of pin 44, arm 26 rotates clockwise an amount sufficient to permit pin 44 to pass arm 26 and lodge between arms 25 and 26. After lodging of pin 44 between arms 25 and 26, downward movement of driving arm 42 will be transmitted through arm 26 to slide 24.

When the slide 24 is near its actuated position as illustrated in FIG. 2, and with the delay means in its rest position, arm 26 is cammed around pin 44 of driving arm 42. Thus, in the actuated position of slide 24, pin 44 of driving arm 42 is positioned between arms 25 and 26. To move arm 26 aside from pin 44 to enable slide 24 to return to its initial position, a cam 47 on shutter blade drive ring 34, which is movable in timed relation with the camera shutter, engages lever 54 of arm 26 so as to cause a clockwise rotation of arm 26 about the slide 24. Such rotation moves arm 26 clear of pin 44 and enables slide 24 to return to its initial position. Thus, although the delay means is coupled with the actuating mechanism near the end of the stroke of the actuating mechanism, it is uncoupled as the shutter runs down and does not affect the exposure actuation.

To energize the delay means for operation, selecting lever 36 is moved from the rest or "R" to the energized or "S" position as illustrated in FIG. 4. This movement tensions spring 35, raises driving arm 42, and releases a blocking member or slide 48 which moves upward under the influence of spring 49. Blocking member 48 is arranged for such vertical movement by virtue of slots through which it is pinned to plate 84 by pins 50. A spring 51, fastened to plate 84 by screw 51a, urges slide 48 against plate 84.

As shown in FIG. 8, with selecting lever 36 of the delay means in its "R" position, a lever arm 52 of slide 48 is forced down by hook 36a of lever 36, with the result that the upper part of slide 48 including blocking arm 53 is forced away from plate 84 against the force of spring 51. In this position, arm 27 of slide 28, fastened to the actuating mechanism by means of pin 43, is free to move vertically past blocking arm 53.

As shown in FIG. 7, when lever 36 is moved to the "S" position, arm 52 of slide 48 moves upward and blocks return movement of selecting lever 36 by obstructing the movement of hook 36. In such a blocking position arm 52 is no longer forced downward with the result that slide 48 returns to a position of flat contact with plate 84 under the force of spring 51. In this position, blocking arm 53 of slide 48 projects into the path of the movement of arm 27 so that slide 28 and slide 24 of the actuating mechanism can travel downward only a sufficient distance to engage arm 53 and move slide 48 downward to the lower limit of its motion as determined by pins 50 engaging slots in slide 48.

When the delay means is energized for operation as described above, and the actuating mechanism is moved downward to initiate an exposure actuation, the arm 27 of slide 28 engages blocking arm 53 of slide 48 and forces slide 48 downward as far as pins 50 will allow it to move. Such downward movement of slide 48 causes downward movement of lever arm 52 past hook 36a and release of lever 36. Such setting free of selecting lever 36 releases the delay means for an automatically operative shift from its energized condition to its rest condition in a timed interval. Play in the coupling is arranged so that discontinuing the downward force on the camera actuating mechanism allows hook 36a to pivot slide 48 to the position illustrated in FIG. 8, in which position arm 27 is free to move past blocking arm 53.

During a timed operation of the delay means, driving arm 42, which was raised up by setting of lever 36, and whose pin 44 was positioned between arms 25 and 26 as described above, is driven downward toward its rest position. As driving arm 42 moves downward under control of the delay means, pin 44, through arm 26, drives slide 24 downward to its actuated position as illustrated in FIG. 5. Such movement of slide 24 initiates adjustment of the exposure regulating device as described above, and operates shutter release lever 32 causing a shutter actuation. With the actuation of the shutter, cam 47 moves to the position illustrated in FIG. 5 where it cams lever 54 and causes rotation of arm 26 as described above so as to free slide 24 of the coupling with pin 44 of driving arm 42 and permit slide 24 to return to its initial position.

This invention has been described in detail with particular reference to preferred embodiments thereof, but it will be understood that variations and modifications can be effected within the spirit and scope of the invention as described hereinabove and as defined in the appended claims.

We claim:

1. In a camera having (a) a shutter including a shutter release member; (b) a camera actuating mechanism movable under manual control to actuate said shutter release member upon reaching a predetermined position; (c) an adjustable regulating device for varying film exposure as a function of scene brightness, the adjustment of said device being initiated by said actuating mechanism in timed relation with actuation of said shutter; and (d) delay means manually movable from a rest condition to a tensioned condition and selectively releasable for automatic movement from said tensioned condition to said rest condition in a predetermined timed interval, the combination comprising: a movable, yieldable blocking member having a first position disengaged from said actuating mechanism and a second position in which said actuating mechanism engages and moves said blocking member prior to adjustment of said regulating device and prior to actuation of said shutter release member; manually operable means for moving said delay means to its tensioned condition and for moving said blocking member to its second position; means responsive to the movement of said blocking means by said actuating mechanism for releasing said delay means; and means coupling said delay means and said actuating mechanism to move said actuating mechanism to said predetermined position in response to the movement of said delay means to its rest condition, said exposure regulating device being adjusted and said shutter release member being actuated substantially at the end of said predetermined time interval.

2. A camera according to claim 1 wherein a member movable in timed relation with said shutter is arranged for uncoupling said delay means and said actuating mechanism.

3. A camera according to claim 1 wherein said blocking member is arranged in said second position for blocking said further movement of said actuating mechanism until initiation of said automatic operation of said delay means.

References Cited by the Examiner
UNITED STATES PATENTS

| | | | |
|---|---|---|---|
| 2,117,971 | 5/38 | Mihalyi | 95—63 |
| 2,938,445 | 5/60 | Strutynski | 95—53.6 |
| 3,007,387 | 11/61 | Rentschler | 95—53 |
| 3,008,395 | 11/61 | Ieda | 95—53.3 |
| 3,037,435 | 6/62 | Rentschler | 95—10 |
| 3,059,557 | 10/62 | Rentschler | 95—53 |

NORTON ANSHER, *Primary Examiner.*

DELBERT B. LOWE, EMIL G. ANDERSON,
*Examiners.*